United States Patent [19]

Jacomini

[11] 4,210,911

[45] Jul. 1, 1980

[54] METHOD FOR DECREASING MINIMUM OBSERVABLE VELOCITY OF MOVING TARGETS

[75] Inventor: Omar J. Jacomini, Severna Park, Md.

[73] Assignee: Westinghouse Electric Corp., Pittsburgh, Pa.

[21] Appl. No.: 861,819

[22] Filed: Dec. 19, 1977

[51] Int. Cl.² ............................................. G01S 9/42
[52] U.S. Cl. ...................................... 343/7.7; 343/7.4
[58] Field of Search ............... 343/5 CM, 16 M, 7.4, 343/7.7

[56] References Cited

U.S. PATENT DOCUMENTS

| | | | |
|---|---|---|---|
| 3,346,859 | 10/1967 | Mullins et al. | 343/7.7 |
| 3,365,719 | 1/1968 | Williams | 343/5 CM X |
| 3,728,724 | 4/1973 | Alpers | 343/16 M X |
| 3,848,253 | 11/1974 | Genuist | 343/5 CM |
| 3,975,734 | 8/1976 | Payne | 343/7.7 |
| 4,005,421 | 1/1977 | Dax | 343/16 M |
| 4,034,373 | 7/1977 | de Pierre et al. | 343/7.7 |
| 4,038,658 | 7/1977 | Nelson er al. | 343/7.7 |
| 4,064,510 | 12/1977 | Chabah | 343/5 CM X |

Primary Examiner—Malcolm F. Hubler
Attorney, Agent, or Firm—H. W. Patterson

[57] ABSTRACT

An airborne radar system and method for detecting and tracking slowly moving ground targets off the boresight of the antenna beam, is disclosed.

6 Claims, 8 Drawing Figures

METHOD FOR DECREASING MINIMUM OBSERVABLE VELOCITY OF MOVING TARGETS

BACKGROUND OF THE INVENTION

In airborne radar systems, where the radar itself is in motion, and it is desired to detect and track objects moving on the ground, such objects must be distinguished from ground clutter. Since the radar is in motion, the clutter appears to be in motion relative to the radar, and the doppler effect shifts the frequency of the clutter echo signal. Thus, the closer the relative velocity of the clutter is to that of the target, the more difficult it is to distinguish between such clutter and the target. Also, in airborne radar systems, designed to detect moving targets on the ground, this motion of the airborne platform causes the clutter from different parts of the antenna beam to spread across the doppler spectrum. This limits the minimum velocity at which moving targets can be detected and/or tracked. Therefore, difficulty is encountered in attempting to distinguish between ground clutter and targets that move slowly, such as in the order of three knots, for example.

Thus, it is desirable to be able to provide a method for detecting and tracking slowly moving targets in the presence of ground clutter by an airborne radar.

SUMMARY OF THE INVENTION

The present invention relates to a method for reducing the minimum velocity that is observable by an airborne radar in the search and/or tracking mode by detecting such target off the boresight of the antenna beam.

In one specific aspect, the method of the present invention may utilize an airborne monopulse radar system, which detects in the search mode slowly moving targets, by using a plurality of overlapping radar beams that are spaced at less than the typical 3 decibel crossover point so that such target may be detected at any place in the radar beam where the apparent velocity of the target is the greatest. In one such a system, the doppler frequency shift of stationary clutter for each radar beam is offset to compensate for the motion of the radar platform so that ground clutter is received as having a zero doppler frequency shift on the boresignt of each respective beam. This may be effected by an offset oscillator for each single receiver. In another system, a single offset oscillator is used for all the receivers with the MTI filter for each receiver being offset relative to the clutter to produce the same result.

The method of tracking the slowly moving target once it is detected may utilize a system which provides for positioning the antenna in accordance with the maximum signal to noise plus clutter ratio and for correcting the apparent velocity to provide a maximum signal to noise plus clutter ratio, thereby insuring that the antenna will maintain the track of the slowly moving target by aligning it at its optimum point which, in general, will be off the boresight.

DESCRIPTION OF THE DRAWINGS

Referring to FIGS. 1A and 1B, assume that an aircraft 10 traveling in the direction of the associated arrow 11 is projecting a conically shaped beam shown as being contained within its leading edge 13 and its trailing edge 14. The beam has a boresight, which may be defined as that imaginary projection which receives an echo signal at maximum amplitude, the location of which, for example, is referred to as line 15.

In FIG. 1A, a target 16 is illustrated as being aligned off the boresight 15 adjacent the leading edge 13 of the beam; a target 17 is aligned with the boresight 15; and a target 18 is shown aligned off the boresight 15 adjacent the trailing edge 14 of the beam. The targets 16, 17, and 18 are assumed to be moving slowly in a direction toward the plane 10.

In FIG. 1B targets 23, 24, 25 are assumed to be stationary. The target 23 is aligned adjacent the leading edge, target 24 is aligned with the boresight, and 25 adjacent the trailing edge of the beam.

Each of the targets of FIGS. 1A and 1B has a component velocity relative to the plane 10 that differs depending on whether or not it is stationary and its relative location within the beam. In FIG. 1A where the targets 16, 17 and 18 are moving, the target 16 adjacent the leading edge 13 of the beam has a component velocity relative to the aircraft 10 represented by line portion 30; the target 17 aligned with boresight 15 has a component velocity relative to the aircraft 10 represented by line portion 31 which component is less than the line portion 30; and the target 18 has zero component of velocity relative to the aircraft 10 as shown in FIG. 1A. For stationary targets 23, 24, and 25 of FIG. 1B, the component velocity relative to the aircraft 10 is represented by line portion 34 at the leading edge 13 of the beam, while there is zero component of velocity relative to the aircraft 10 for target 24 at the boresight, and a component of velocity relative to the aircraft represented by line portion 35 adjacent the trailing edge of the beam.

Thus, for moving targets the apparent velocity relative to the radar platform is greatest off the boresight. Similarly, for stationary targets or ground clutter, there is an apparent velocity off the boresight of the beam, which decreases to zero as it approaches boresight alignment. For such stationary targets or ground clutter the symetrically varying velocities as the beam scans the target can be cancelled out. However, in cancelling out such velocities, the slowly moving targets on the boresight, which may have the same apparent velocity as stationary targets or ground clutter off the boresight are also cancelled out, thus preventing detection of such slowly moving targets from an airborne radar.

Figure 2:
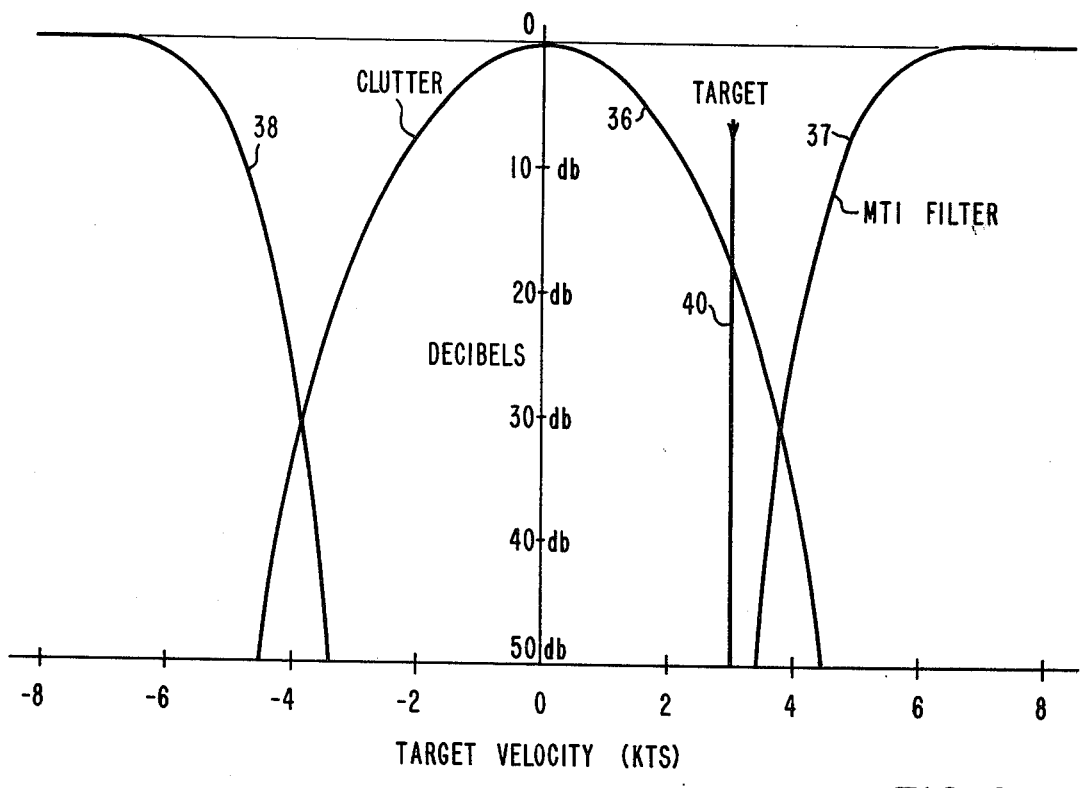
FIG. 2 is a diagram illustrating a typical clutter spectrum from a moving platform.
Figure 3:
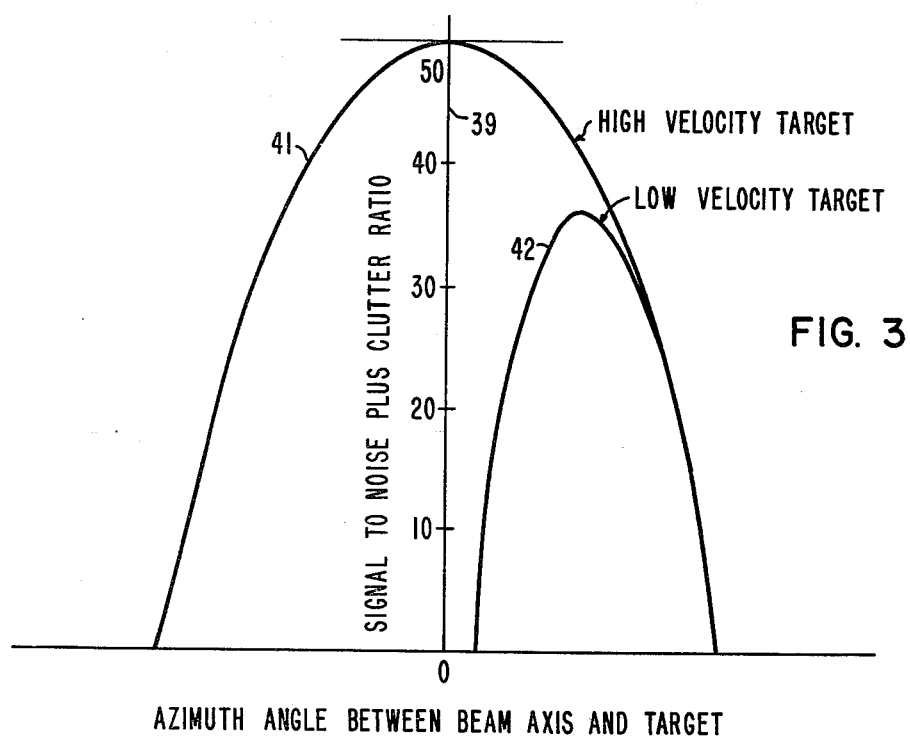
FIG. 3 is a diagram illustrating the results obtained when the beam is scanned away from the target in accordance with the present invention.

In understanding the present invention and referring to FIG. 2, curve 36 represents a typical clutter spectrum from a moving platform. A moving target indicator (MTI) filter response represented by curves 37 and 38 is shown in FIG. 2. Referred to at line 40 is a doppler spectral line of a target with an approximate three knot velocity over the ground. When the antenna boresight is pointed at the target it is observed that such three knot target is rejected by the MTI filter, since its attenuation is in excess of sixty decibels. However, as the beam scans past this target to place it off the boresight, its apparent velocity which is greater than its actual velocity will move it up the side of the filter response curve 37. As shown in FIG. 3, curve 42 the optimum target response occurs when the target is significantly off-boresight, and the sensitivity at this angle is many tens of decibels greater than when the target is on boresight. The peak of the response of the target off-boresight is less than the peak for the high velocity target because of the antenna gain loss at this offset angle; and because of the filter gain loss, since the target has not yet reached the peak of the filter velocity response. The signal to noise plus clutter ratio then decreases with the decreasing antenna gain as the beam is scanned further.

With reference to FIG. 3, there is illustrated the relationship between the boresight axis of the antenna and the signal to noise plus clutter ratio for a target with a velocity above ten knots, for example, as shown by curve 41 and a three knot target as shown by curve 42. For the higher velocity ten knot target, it may be observed that the ratio of signal to noise plus clutter is at the highest on the boresight axis referred to at 39 and falls away until no detection occurs. In contrast, it is seen that at zero degree angle or on the boresight axis, negligible detection occurs for the three knot target; and this increases as the beam is scanned past the target until it is at a maximum at point 42A. The absolute magnitudes, of course, are of little or no significance; only the relative changes are important. Thus, as the boresight of the beam is scanned away from the three knot target, its detection improves. Such effect is achieved because scanning of the beam shifts the beam to patches of clutter on the ground which have lower doppler frequency shifts, thereby unmasking the target. It may be observed from FIG. 3 that the three knot target appears to be observed by a beam 42 which is less than half the width of beam 41 for the target of higher velocity, with a two way gain that is reduced by approximately 13 db relative to the higher velocity target. The detection of such a slowly moving target in the search mode may then be achieved by rejecting the clutter and radiating power such that the thirteen decibel loss is overcome together with searching in azimuth with a plurality of parallel receive beams, such as three, contained within a single transmit beam. In conventional multi-beam radars, the beams are overlapped such that the beams cross over at a point approximately three decibels from the peak. In accordance with one aspect of the invention, the multiple beams are overlapped closer than the 3 db. point. Also, the multiple receive beams are offset from each other to insure that a given low velocity target will have a component of velocity modulation in at least one of the multiple beams, such that, when summed with the target apparent velocity, will provide a good filter response without too large a loss due to being off the peak gain position of the antenna. For a multiple PRF system by using two receive beams for each PRF, for example, and electronically shifting the antenna patterns for the second PRF by a small amount from the first PRF, a four-beam system may be obtained for low velocity targets. The advantage of this technique is that the two receive beams can be formed using monopulse radar system receivers, which minimize the modifications required to effect the off-boresight detection in accordance with the method of the present invention.

Another technique, which may be used for detecting slowly moving targets off boresight is to offset alternate scans by one-half a beam position. This inserts additional beams on alternate scans. The high velocity targets have good filter response on every scan, and the only effect of offsetting alternate scans on high velocity is to average out the scan modulation. Lower velocity targets then, will be detected on alternate scans, and hence, have a lower data rate than high speed targets.

Once a low velocity target has been observed by the method of the present invention or by the bi-static method of observing low velocity targets as described in U.S. Pat. No. 4,048,637 entitled "Radar System for Detecting Slowly Moving Targets", such a target may be tracked to very low velocities. In the tracking mode, a narrow band tracking filter which locks onto the doppler spectrum of the slowly moving target replaces the MTI filter, the response of which is shown in FIG. 2. In a monopulse radar system, such tracking may be effected for example by positioning the antenna in accordance with the maximum signal to noise plus clutter ratio of the target echoes and maximizing the doppler return with the maximum signal to noise plus clutter ratio in the velocity correction apparatus, rather than the conventional method of utilizing absolute values to effect such velocity correction and positioning.

Figure 1A:
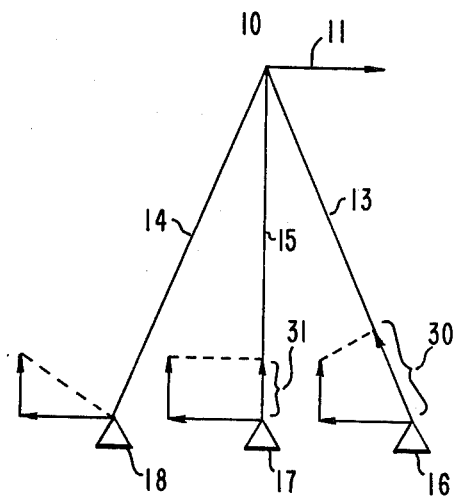
FIGS. 1A and 1B are diagrams to illustrate the principle utilized in the present invention to detect slowly moving targets.
Figure 1B:
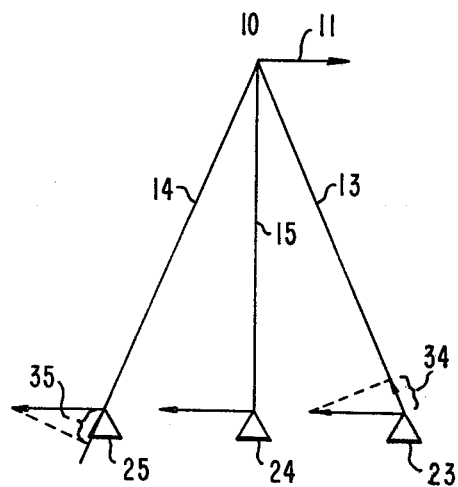
Figure 4:
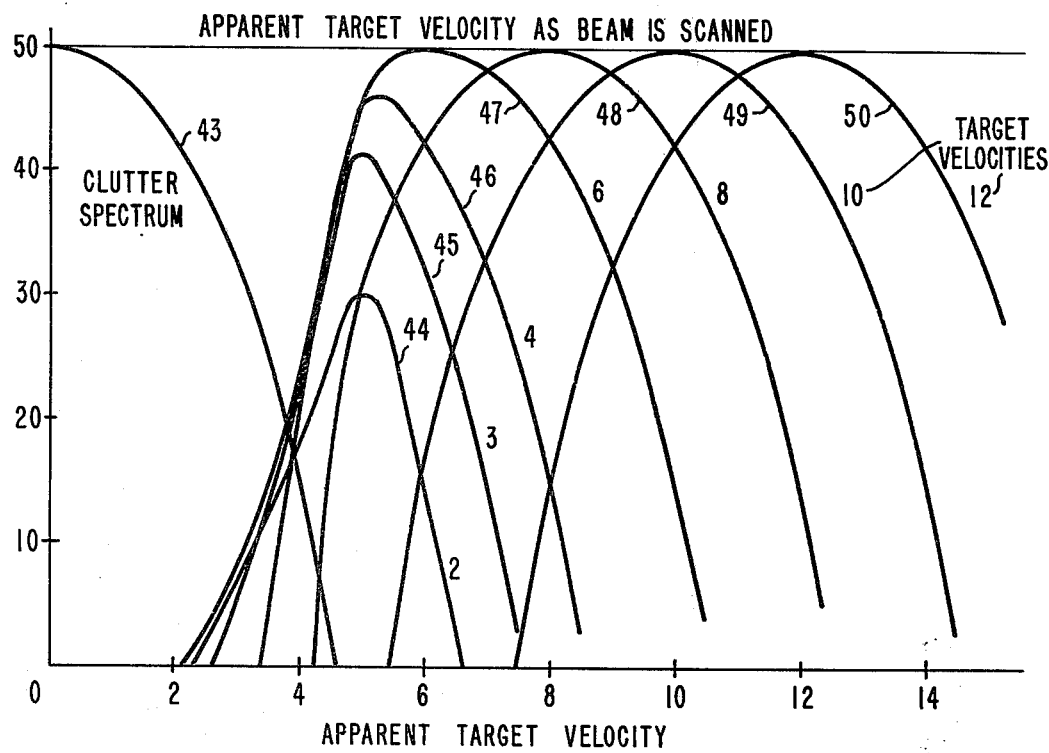
FIG. 4 is a diagram of the signal to noise plus clutter ratio of various speed targets plotted versus their apparent velocity as the beam is scanned across the targets.

Referring to FIG. 4, which shows the relationship of apparent target velocity versus signal to noise plus clutter ratio, curve 43 represents the clutter spectrum which may have an apparent velocity of from zero to in excess of four knots, for example, as the beam is scanned, which was described in connection with the description of FIG. 1B. Curves referred to at 44, 45, 46, 47, 48, 49, and 50 represent the apparent velocity of targets at two, three, four, six, eight, ten, and twelve knots, respectively. The apparent velocity of the target is the observed velocity difference between the targets and a piece of stationary clutter located at the center or boresight of the beam. Targets with apparent velocities of from two to four knots as represented by curves 44, 45, and 46 have a maximum signal to noise plus clutter ratio that peaks at an apparent velocity of approximately five knots, regardless of actual velocity; whereas, targets with an apparent velocity of six knots and above as represented by curves 47 through 50 peak at their actual target velocity. Thus, in accordance with the present invention, the slower targets may be tracked by holding a narrow band tracking filter at five knots. For the faster targets the tracking filter will move up in doppler to the actual velocity of the target. The integration provided by the narrow band filter should be enough to overcome the reduced signal to noise plus clutter ratio of the lower velocity targets.

Figure 5:
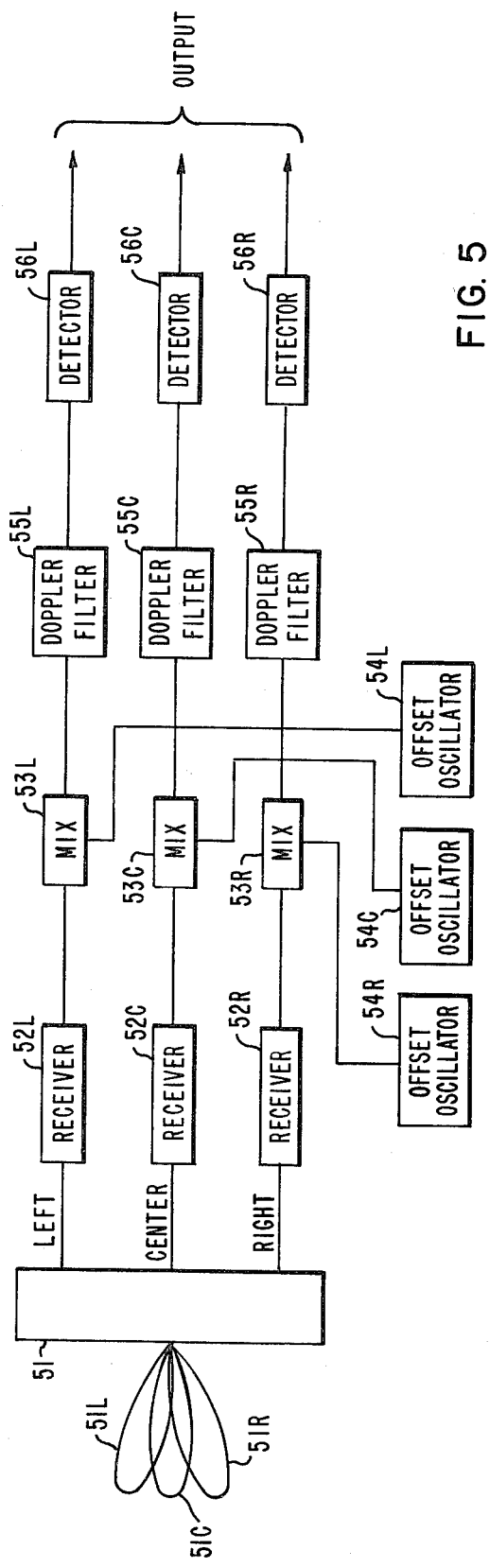
FIG. 5 is a general block diagram of a radar system which may be used for detecting a slowing moving target in carrying out the method of the present invention.

Referring to FIG. 5, a schematic block diagram of the receiver portion of an airborne monopulse radar system is shown which may be used for receiving and detecting the echo returns of a slow moving target in accordance with the present invention. The transmitter portion not shown sends out a single beam in a conventional fashion which overlaps the multiple receive beams shown. An antenna 51 receives a plurality of overlapping beams 51L, 51C, and 51R, preferably have crossover points of less than 3 db as mentioned previously herein to better insure that a slow moving target is detected off the boresight of one of the beams of the antenna. The received frequencies from each beam are mixed at their respective mixers 53L, 53C and 53R with an offset frequency from its respective oscillator 54L, 54C and 54R. The offset oscillators 53L, 53C, and 53R are so constituted that the clutter is put in the center of their filters and is thereby rejected allowing targets to be detected off the boresight. Then the output of the offset frequency from each mixer is applied to its doppler filter 55R, 55C, and 55L, respectively. The filtered output is then applied to detectors 56L, 55C and 56R to detect the target having an echo pulse reflected from either of the beams. This output is then applied in a conventional manner.

Figure 6:
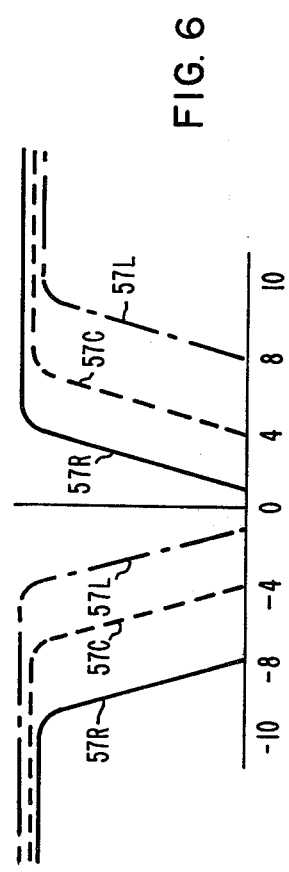
FIG. 6 is a graphical illustration of a typical offset for the moving target doppler filters of an alternate system which may be used for detecting a slowing moving target in accordance with the present invention.

Another system that could be used to practice the method of the present invention would be the same as described in connection with FIG. 5, except one common offset oscillator is utilized for all the mixers 53C, L and R and the doppler filters 55L, 55C, and 55R are so constituted to be offset as shown in FIG. 6. The solid line referred to at 57R would reject the clutter from the right beam 51R. The dashed line 57C would reject the clutter from the center beam 51C; and the short and long dashed line 57L would reject the clutter from the left beam 51L. Thus, targets are permitted to be detected in an optimum fashion off the boresight.

Figure 7:
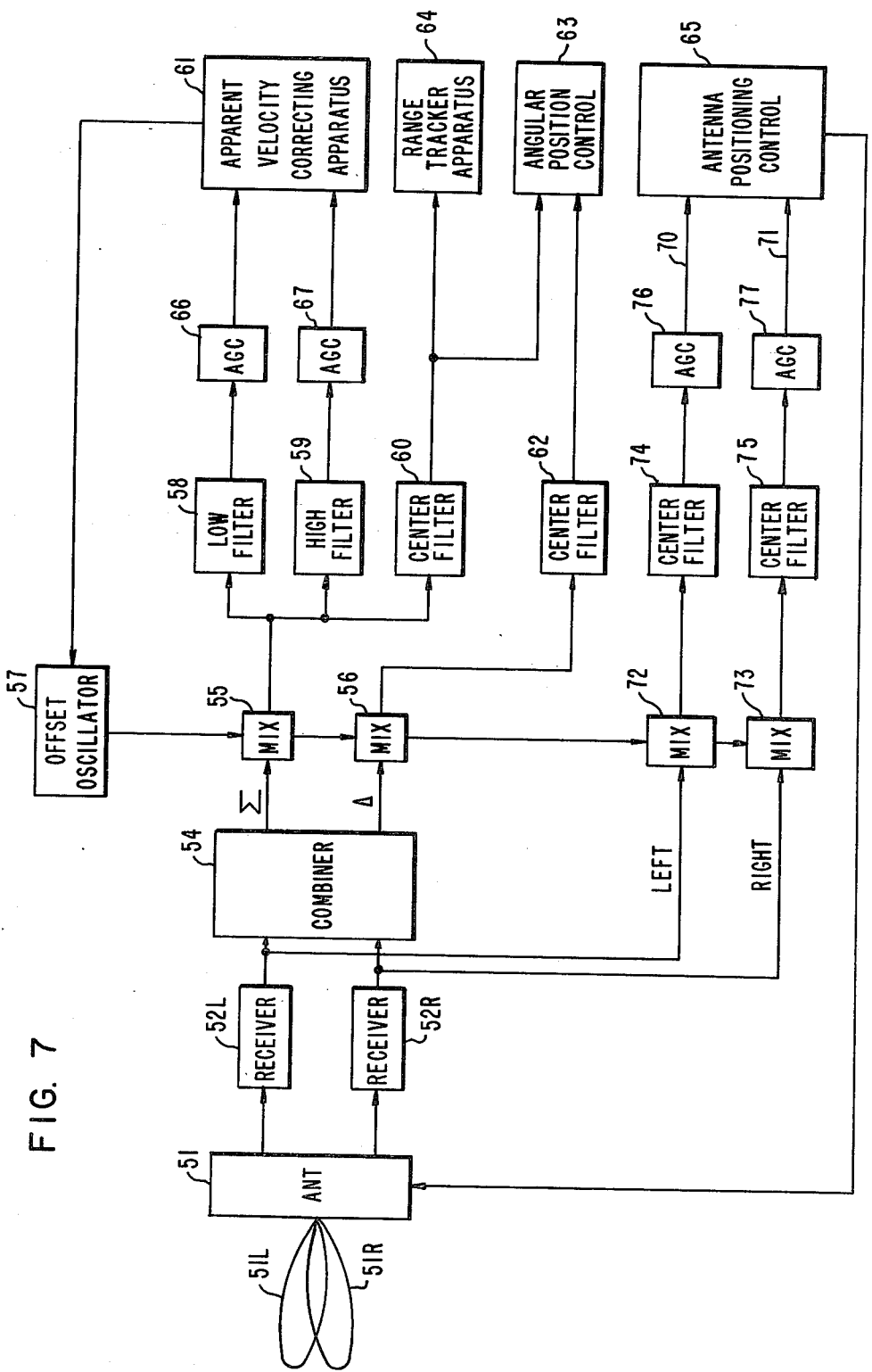
FIG. 7 is a general block diagram of a radar system which may be used for tracking a slowly moving target for carrying out the method of the present invention.

Referring to FIG. 7, which is a block diagram of the receiver portion of a typical system capable of performing the tracking function according to the present invention, is assumed to be a monopulse radar system that has an antenna 51, which may be a phased array antenna that has beams 51R and 51L, respectively. The target displacement is sensed by comparing the amplitude of the signals received in each of the beams, as described in connection with FIG. 5.

A receiver 52L is provided to receive the target echo pulses of one beam in azimuth, such as the left-hand beam, for example, and a receiver 52R receives the target echo pulse of the other beam in azimuth, such as the right-hand beam for example. A combiner 54, which may be conventional performs the functions of forming sum and difference beams, which function is well known in the art. The summed signals from the left and right-hand beams 51L and 51R; and the difference signals from the left and right-hand beams 51L and 51R are mixed by mixers 55 and 56, respectively, with the frequency of an offset oscillator 57. The offset oscillator generates a frequency which is adjusted to be of a value to hold the sum and difference frequencies from the target in the doppler filters.

The output of the mixer 55 is filtered through a low band-pass filter 58 and a high band-pass filter 59, the output of which is applied to an apparatus 61 for correcting changes in apparent velocity of the target by feeding back the information through the offset oscillator 57 so as to maintain the target signals in an optimum position in the filters 58, 59, 60, 62, 74, 75. AGC circuits 66 and 67 are designed to maximize the signal to noise plus clutter ratio as hereinbefore described. Also mixer 56 is applied to a center band-pass filter 62 which in combination with the output of the mixer 55 and a center band-pass filter 60 operate apparatus 63 in a conventional manner to generate signals relating to the angular position of the target for well-known purposes. The output of the center band-pass filter 60 is also applied to conventional range tracking apparatus to generate signals corresponding to the range of the target.

For tracking moving targets which may be off the boresight of the antenna in accordance with the present invention, a conventional antenna positioning apparatus 65 is used to position the antenna 51 in accordance with signals on line 70 and 71. However, instead of positioning the antenna to a point where the target return is at a maximum, which would be the boresight of the antenna, it is positioned to a point where the signal to noise plus clutter ratio of the signal is at a maximum, which disregards the boresight. To accomplish such off-boresight antenna positioning for tracking, the receiver 52 output from the left-hand beam 51L is applied to a mixer 72 and the receiver 52R output is applied to a mixer 73; and the output of each of the mixers is applied to a respective center band-pass filter 74 and 75. In turn, the output of the filter 74 from the left-hand beam is applied to an automatic gain control circuit 76, and the output of the center filter 75 from the right-hand beam is applied to an automatic gain control circuit 77, and the antennae positioning controller then operates the antenna to attain such maximum ratio of signal to noise plus clutter which for slowly moving targets will not be on the boresight of the antenna.

In summary, the feedback circuit that is utilized to correct the frequency of the offset oscillator 57 includes the automatic gain control circuits 66 and 67; and the feedback circuit that is utilized to correct the beam position of the antenna 51 includes the automatic gain control circuits 76 and 77. In both of these feedback circuits, the automatic gain control circuits normalize the noise plus clutter signal to obtain a maximum target signal to noise plus clutter ratio for the apparent velocity correction apparatus 61 and the antenna positioning controller 65. Thus, these feedback circuits will center their respective loops at the point where the target signal to noise plus clutter ratio is at a maximum. The angle and range are measured in a conventional manner by the wellknown apparatus 63 and 64, respectively.

The various systems briefly described, mentioned and illustrated herein are by way of example only, and that the teaching of the present invention will suggest to those skilled in the art other systems or variations for practicing the method of the present invention.

I claim:

1. A method of decreasing the minimum velocity of a moving target observable by an airborne radar system comprising
   transmitting a radar beam from the airborne radar system toward the earth;
   receiving radar echoes having different doppler frequency shifts corresponding to the apparent velocity of target, clutter, and objects in a plurality of overlapping beams having crossover points of less than 3 decibels, to compensate for decreased single beam two way gains when detecting slow moving targets off boresite;
   scanning away from potential targets to improve detection of slow moving targets;
   rejecting the echoes having a doppler frequency shift corresponding to the apparent velocity of stationary targets and clutter at maximum amplitude in each beam; and detecting the echoes including the echoes from slow moving targets having a doppler frequency shift corresponding to targets having an apparent velocity greater than the stationary ground clutter.

2. A method according to claim 1 wherein the receiving step includes offsetting each alternate scan of the antenna by one-half a beam position to provide additional beams on alternate scans.

3. A method according to claim 1 wherein the step of rejecting the echoes includes
offsetting the doppler frequency shift of each of the plurality of beams to receive the echo from stationary ground clutter as a zero doppler frequency shift, and
rejecting the zero doppler frequency shift.

4. A method according to claim 3 wherein the step of offsetting the doppler frequency shift, comprises off-setting a moving target indicator filter for a respective beam relative to the clutter by a different predetermined amount.

5. A method of tracking a slowly moving target by an airborne radar wherein the step of detecting a target includes the generation of a first signal corresponding to the angle of the target off the boresite of an antenna and a second signal corresponding to the doppler shift signal of the target relative to ground clutter, said method of tracking comprising
transmitting a pair of radar beams in a direction that is a function of the first generated signal,
receiving echoes from a detected target for each of the beams;
generating said first and second signals as a function of each of said received echoes;
filtering independently each of said generated second signals to pass a narrow band doppler signal including the frequency of the second signal generated during the step of detecting the target to obtain a filtered signal that includes the target signal and noise and residual clutter, said filter includes modifying independently each of the filtered second signals as the doppler frequency of each of the second signals vary while tracking to maximize the ratio of the target signal to the sum of the noise plus clutter;
normalizing each of said maximized filtered second signals as a function of noise plus clutter; and
changing the position of the antennas to direct the pair of beams in a direction that is a function of both normalized signals, whereby positioning the antenna according to said normalized signals each having a maximized ratio of target signal to sum of the noise plus clutter of the radar echo.

6. A method according to claim 5 wherein the step of detecting the echo of a slowly moving target comprises
transmitting a radar beam from the airborne radar system toward the earth;
receiving radar echoes having different doppler frequency shifts corresponding to the apparent velocity of target, clutter, and objects in a plurality of beams within the transmit beam having crossover points of less than 3 decibels, to compensate for decreased single beam two way gains when detecting slow moving targets off boresite;
scanning away from potential targets to improve the detection of slow moving targets;
rejecting the echoes having a doppler frequency shift corresponding to the apparent velocity of stationary targets and clutter at maximum amplitude; and
detecting the echoes having a doppler frequency shift corresponding to targets having an apparent velocity greater than the stationary ground clutter.

* * * * *